United States Patent
Phillips

(10) Patent No.: US 10,488,059 B2
(45) Date of Patent: Nov. 26, 2019

(54) DIRECT EXPANSION AIR CONDITIONING SYSTEM WITH SEPARATE OUTDOOR AIR LATENT COOLING AND RETURN AIR SENSIBLE COOLING ARRANGEMENTS

(71) Applicant: SMAC TECHNOLOGIES PTY LTD, Kent Town, South Australia (AU)

(72) Inventor: Peter George Phillips, Carrick (AU)

(73) Assignee: SMAC Technologies Pty Ltd (AU)

(*) Notice: Subject to any disclaimer, the term of this patent is extended or adjusted under 35 U.S.C. 154(b) by 101 days.

(21) Appl. No.: 15/507,700

(22) PCT Filed: Aug. 28, 2015

(86) PCT No.: PCT/AU2015/000522
§ 371 (c)(1),
(2) Date: Feb. 28, 2017

(87) PCT Pub. No.: WO2016/033633
PCT Pub. Date: Mar. 10, 2016

(65) Prior Publication Data
US 2017/0284696 A1    Oct. 5, 2017

(30) Foreign Application Priority Data

Sep. 1, 2014   (AU) .............................. 2014903479

(51) Int. Cl.
*F24F 3/14*    (2006.01)
*F24F 3/052*   (2006.01)
(Continued)

(52) U.S. Cl.
CPC ................ *F24F 3/052* (2013.01); *F24F 3/14* (2013.01); *F24F 12/00* (2013.01); *F25B 5/02* (2013.01);
(Continued)

(58) Field of Classification Search
CPC ...... F24F 3/052; F24F 3/14; F25B 5/02; F25B 31/004; F25B 40/02; F25B 43/006; F25B 43/02; F25B 2500/16; Y02B 30/542
See application file for complete search history.

(56) References Cited

U.S. PATENT DOCUMENTS 5,054,542 A * 10/1991 Young ...................... F24F 5/00
                                                      165/58
5,228,302 A    7/1993  Eiermann
(Continued)

FOREIGN PATENT DOCUMENTS

DE       10027467 A1    12/2001
WO     2008061297 A1     5/2008

OTHER PUBLICATIONS

Written Opinion of the International Searching Authority in PCT/AU2015/000522 dated Nov. 11, 2015.
(Continued)

*Primary Examiner* — Jonathan Bradford
(74) *Attorney, Agent, or Firm* — Polsinelli PC

(57) ABSTRACT

An air conditioning system capable of treating a conditioned space by treating outdoor air from outside the conditioned space and treating air returned from inside the conditioned space, and mixing the outdoor air with the returned air to form supply air for the conditioned space, the air conditioning system including:
  an outdoor air latent cooling treatment stage and a return air sensible cooling treatment stage, and
  an air mixer for mixing outdoor air with return air to form the conditioned space supply air;
  wherein the outdoor air latent cooling treatment stage includes a dehumidification evaporator and the return air sensible cooling treatment stage includes a sensible evaporator, both evaporators being coupled to a direct expansion refrigeration circuit, and wherein the dehu-
(Continued)

midification evaporator thermal capacity is regulated in response to conditioned space humidity and the sensible evaporator thermal capacity is regulated in response to conditioned space dry bulb temperature.

16 Claims, 2 Drawing Sheets

(51) Int. Cl.
- *F25B 5/02* (2006.01)
- *F24F 12/00* (2006.01)
- *F25B 43/00* (2006.01)
- *F25B 31/00* (2006.01)
- *F25B 43/02* (2006.01)
- *F25B 40/02* (2006.01)

(52) U.S. Cl.
CPC .............. *F25B 31/004* (2013.01); *F25B 40/02* (2013.01); *F25B 43/006* (2013.01); *F25B 43/02* (2013.01); *F25B 2500/16* (2013.01); *Y02B 30/542* (2013.01)

(56) References Cited

U.S. PATENT DOCUMENTS

| | | | |
|---|---|---|---|
| 6,488,120 B1* | 12/2002 | Longsworth | F04B 39/04 184/6.16 |
| 2002/0033024 A1* | 3/2002 | Hebert | A61B 17/322 62/183 |
| 2006/0218965 A1* | 10/2006 | Manole | F25B 40/00 62/513 |
| 2010/0018228 A1* | 1/2010 | Flammang | F25B 27/02 62/115 |
| 2010/0065650 A1* | 3/2010 | Phillips | F24F 3/001 236/12.13 |
| 2014/0102665 A1* | 4/2014 | Sibik | F25B 49/02 165/11.1 |

OTHER PUBLICATIONS

English Language Abstract of DE10027467 Obtained on Feb. 26, 2017.

\* cited by examiner

DIRECT EXPANSION AIR CONDITIONING SYSTEM WITH SEPARATE OUTDOOR AIR LATENT COOLING AND RETURN AIR SENSIBLE COOLING ARRANGEMENTS

CROSS-REFERENCE TO RELATED APPLICATIONS

This application is a national stage entry of PCT/AU2015/000522 filed Aug. 28, 2015, which claims convention priority from Australian provisional patent application 2014903479 filed on 1 Sep. 2014, the contents each of which are hereby incorporated by reference in their entirety.

TECHNICAL FIELD

The present invention relates to an improved air conditioning system, specifically a direct expansion air conditioning system where air supplied to a conditioned space is directly cooled by a refrigerant supplied evaporator.

BACKGROUND OF INVENTION

Conventional air conditioning design theories were challenged in the 1990's by a series of innovative thoughts developed by the late Dr Allan Shaw. These thoughts culminated with the air conditioning control system described in Dr Shaw's Australian patent 728987. This patent, and the system it describes, is now owned by the present applicant and will be referred to throughout this specification as the "Shaw system".

The Shaw system is a system that operates air conditioning functions in parallel to separate the process of treating latent loads (typically to remove moisture from outdoor air) and sensible loads (typically internal air which is dry). The Shaw system differs from conventional air conditioning processes in that, rather than drawing untreated outdoor air and then cooling it within the total air conditioning system, incoming outdoor air is pre-treated (dehumidified and cooled) by a first, separate outdoor-air heat exchanger before being merged with typically dry (treated or untreated) inside air that generally has been cooled by a second heat exchanger. The two air streams are merged, to then be delivered to a conditioned space.

Additionally, the Shaw system includes the passage of the same cooling medium stream (typically water) through both heat exchangers, in series, to maximize efficiency.

The Shaw system thus describes broad concepts of two evaporator coils, configured into one refrigeration circuit. However, the description of the method of operation of the refrigeration circuit in Australian patent 728987 is only briefly conceptualised.

An aim of the present invention is to enhance the Shaw system, in particular by providing improved refrigeration componentry and control methodology that more clearly allows for the adoption of the Shaw system in a direct expansion air conditioning system, with the incorporation of additional energy efficiency componentry and control methodology.

Having said that, the present invention also aims to provide an air conditioning system that is well suited to allow compliance with building standards that relate to ventilation amenity in buildings, while at the same time reducing energy usage by the building to desirably low levels.

In this respect, there is increasing importance being placed upon the use of adequate proportions of outside air to provide a building's occupants with a healthy and comfortable environment. Indeed, requirements for the maintenance of $CO_2$ levels in buildings below unhealthy and dangerous levels are increasingly being mandated in countries via local building codes and standards. An example is Standard 62.1 of the ASHRAE 62 Standard titled *"Ventilation and Acceptable Indoor Air Quality in Commercial, Institutional and High-Rise Residential Buildings"*.

However, the use of higher proportions of outside air (to help achieve compliance with the maintenance of $CO_2$ levels in buildings below unhealthy and dangerous levels), such as by opening dampers by greater extents or for longer periods, typically requires higher energy usage in air conditioning systems, particularly when the ambient conditions include higher temperatures or higher humidity levels. At a time when building owners are also under pressure to reduce overall energy usage, this tension between adequate ventilation with outside air and low energy use is driving the development of improved air conditioning systems.

Before turning to a summary of the present invention, it must be appreciated that the above description of the prior art has been provided merely as background to explain the context of the invention. It is not to be taken as an admission that any of the material referred to was published or known, or was a part of the common general knowledge in Australia or elsewhere.

SUMMARY OF INVENTION

The present invention provides an air conditioning system, the air conditioning system being capable of treating a conditioned space by treating outdoor air from outside the conditioned space and treating air returned from inside the conditioned space, and mixing the outdoor air with the returned air to form supply air for the conditioned space, the air conditioning system including:

an outdoor air latent cooling treatment stage and a return air sensible cooling treatment stage, and an air mixer for mixing outdoor air with return air to form the conditioned space supply air;

wherein the outdoor air latent cooling treatment stage includes a dehumidification evaporator and the return air sensible cooling treatment stage includes a sensible evaporator, both evaporators being coupled to a direct expansion refrigeration circuit, and wherein the dehumidification evaporator thermal capacity is regulated in response to conditioned space humidity and the sensible evaporator thermal capacity is regulated in response to conditioned space dry bulb temperature.

In one form of the present invention, the two evaporators will be configured in parallel so as to separately treat outdoor air and return air. In another form of the present invention, the two evaporators will be configured in series such that the outdoor air is treated by the dehumidification evaporator, the treated outdoor air to then be mixed with untreated return air, with the mixed air stream then being treated by the sensible evaporator. In the preferred arrangement, the evaporators are configured in parallel, which will be the arrangement that is generally described in the following description.

The dehumidification evaporator provides latent cooling to the outdoor air used to ventilate the conditioned space. In a preferred form, air is induced by a system supply air fan and airflow is regulated by an automated damper, with the ambient airflow volume measured by a differential pressure sensor and an included ambient air sensor preferably incorporating carbon dioxide, dry bulb and humidity sensing. Liquid refrigerant flow through the dehumidification evaporator is preferably regulated through the evaporator by automated stop and metering valves.

The sensible evaporator provides sensible cooling to the conditioned space return air. In a preferred form, air is again induced by the system supply air fan with the supply airflow being regulated by a variable frequency drive coupled to the supply air fan, and with the return airflow volume being measured by a differential pressure sensor and an included return air sensor that preferably incorporates carbon dioxide, dry bulb and humidity sensing. Liquid refrigerant flow through the sensible evaporator is again preferably regulated through the evaporator by automated stop and metering valves.

The present invention thus provides the opportunity to control both dry bulb temperature and humidity within the conditioned space by maintaining separation of the airflow associated with ventilating the conditioned space from the airflow required to offset the sensible heat load of the conditioned space. The use of outdoor air, desirable for maintaining ventilation amenity in a building but usually problematic for the energy usage of air conditioning systems, is advantageous and important in a system in accordance with the present invention.

In this respect, as buildings have become more efficient at sheltering the occupied space from ambient conditions, the relationship between the ratio of latent cooling and sensible cooling has increased, typically resulting in elevated humidity within the building, thereby causing discomfort to occupants. In addition to this, the part load operation of conventional direct expansion refrigerated air conditioning systems preferentially satisfies sensible loads over that of latent loads, thereby accentuating the potential for occupant discomfort from elevated humidity within the conditioned space. On the other hand, the present invention enhances the sophistication of refrigeration componentry to the extent that the latent cooling capacity can be separately regulated from the sensible cooling capacity, thus more easily satisfying comfort conditions with the space.

The system of the present invention may also include a liquid refrigerant receiver that stores transitional refrigerant, preferably being able to provide both storage and regulation of liquid flow through the system. Ideally, the liquid refrigerant receiver is capable of performing at least some oil separation (of the compressor oil from the refrigerant) and will also aid in determination of the required compressor refrigerant mass flow rate to meet system load to achieve enhanced flow of refrigerant and oil through the system. In a preferred form, the liquid refrigerant receiver incorporates liquid level sensing, an automated pressure equalization valve and automated oil return valves.

Ideally, the liquid refrigerant receiver is also capable of providing a greater refrigerant mass charge, reducing the potential for an excessive gas compression ratio and improving evaporator heat transfer efficiency by its use as an oil separator. The present invention preferably incorporates a two stage refrigerant oil separation system that reduces oil flow through the system, which increases evaporator heat transfer efficiency, thereby reducing the potential physical size of the evaporators and improves the performance of refrigerant metering valves to more closely approximate capacity delivery to offset the presented heat load.

Such a two stage refrigerant oil separation system will ideally include a first stage hot gas (oil) separator and a second stage cool liquid (oil) separator, the latter being provided, in a preferred form, by the liquid refrigerant receiver. In this form, both separators return separated oil to the compressor via suction gas refrigerant. In this respect, the traditional use of reduced capacity liquid receiving devices (or the total omission of such devices) in small space, air cooled, direct expansion air conditioning systems reduces the mass of refrigerant within the system, rendering the mass charge more important in the performance of the system and providing an improvement to the energy efficiency of the system over time.

The present invention thus provides not only relative independence of control of latent and sensible capacity delivery through its inclusion of dual evaporators, but it also enhances the variability of capacity delivery through the separation of control of the refrigerant mass flow by the compressor, determined by space loads, to the volumetric use of liquid refrigerant within the system, by the inclusion of the liquid refrigerant receiver and its preferred role as a second stage oil separator. In this respect, it will be appreciated that the present invention ideally meters refrigerant mass flow on the basis of evaporator loads and not the quality of suction gas. This permits the suction gas to return to the compressor with a higher rate of super-heat, thereby enhancing the refrigerant mass flow refrigeration effect.

The present invention preferably also utilizes refrigerant temperature sensing to provide heat rejection relative to the potential for cooling from the ambient dry bulb temperature and the potential for liquid refrigerant sub cooling to enhance the refrigeration effect from the potential for cooling from the ambient wet bulb temperature. In a preferred form, the system of the present invention includes a sub-cool heat exchanger to reject heat into the local ambient air to sub cool liquid refrigerant. In one form, the sub-cool heat exchanger can incorporate an adiabatic pre-cooling media, or a progressive indirect adiabatic cooling process, together with a fan to move air through the condensers, a refrigerant temperature sensor and a variable performance drive to regulate the mass flow rate of the fan.

The refrigeration effect of the system of the present invention may be further enhanced through the reclaim of energy from the latent cooling load to sub-cool the heat of rejection to approach the evaporator operating temperature. A reduction of the temperature of the liquid refrigerant feeding the evaporators enhances the potential refrigeration effect, resulting in a reduced compressor mass flow rate. In this respect, the system of the present invention may also include a system for the capture and utilization of latent cooling condensate to regain energy associated with the latent cooling process, preferably in the form of a sub-cool heat exchanger to sub-cool liquid refrigerant utilizing condensate collected from the dehumidification evaporator of the outdoor air latent cooling treatment stage.

The system of the present invention thus ideally provides a three stage heat of rejection process that incorporates an ambient condenser, the sub-cool heat exchanger and the sub-cool heat exchanger to achieve an enhanced refrigeration effect for the circulating refrigerant mass flow rate. The use of such a three stage heat of rejection process incorporating sub-cooling from the system latent cooling load as determined by the space humidity sensor, and the decoupling of the compressor suction condition from direct management of the refrigerant flow rate, assists to enhance the utilization of the refrigeration effect potential of the low pressure transition from sub-cooled liquid to super-heated gas.

Furthermore, through the preferred use of dry bulb, wet bulb and suction temperature sub-cooling control of head pressure and load determined evaporator temperature, and suction super-heating, a resulting increase in refrigeration effect is seen with reduced compression ratios. This reduces the energy required to develop refrigerant compression, thereby improving the compressor refrigeration coefficient of performance.

Before turning to a more detailed description of a preferred embodiment of a direct expansion air conditioning system in accordance with the above broad descriptions, it will thus be appreciated that the system of the present invention provides cooling to a conditioned space that manages both dry bulb temperature and moisture content to enhance occupant comfort.

In one preferred form described above, the system ideally utilizes ambient dry bulb, ambient vapour pressure and reclaim of space latent cooling to reduce the condensing temperature associated with low pressure expansion to extend the refrigeration effect of the compressor mass flow rate.

In another preferred form described above, the system alternatively or in addition utilizes a liquid receiver to de-couple compressor mass flow from variable heat load requirements, thereby reducing compressor discharge pressure and permitting enhanced utilization of refrigerant gas super heat within the evaporators.

In yet another preferred form described above, the system alternatively or in addition utilizes a two stage compressor oil separation process to enhance heat transfer of both the condenser and evaporators, and alternatively or in addition utilizes ambient and conditioned space sensors to regulate the rate of introduction of outdoor air for amenity and the rate of supply air circulation to deliver cooling to the space.

The adoption of some or all of these preferred forms in a direct expansion air conditioning system broadly in accordance with the present invention reduces energy consumption associated with providing the required levels of comfort and amenity (particularly with regard to ventilation) for occupants of a conditioned space.

BRIEF DESCRIPTION OF DRAWINGS

Having briefly described the general concepts involved with the present invention, a preferred embodiment of a direct expansion air conditioning system will now be described that is in accordance with the present invention. However, it is to be understood that the following description is not to limit the generality of the above description.

DETAILED DESCRIPTION OF PREFERRED EMBODIMENT

Figure 1A:
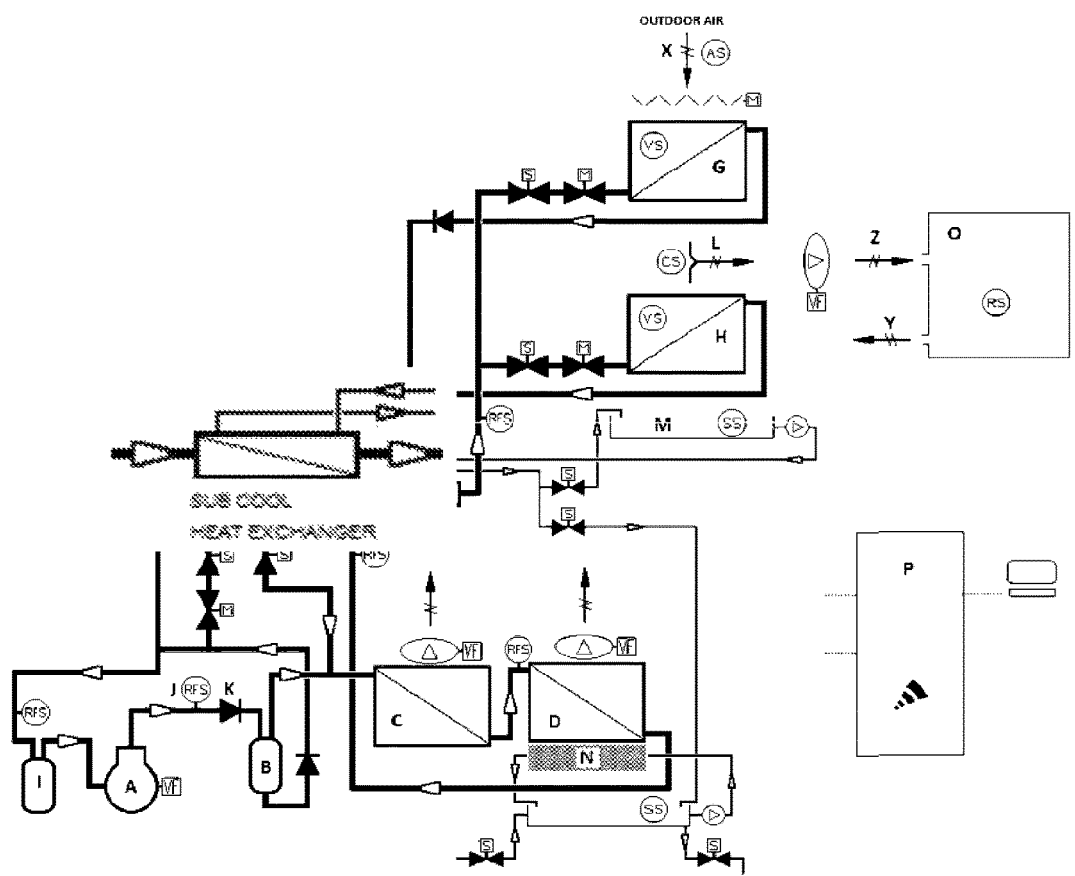
FIG. 1A is a flow diagram of a preferred embodiment of a direct expansion air conditioning system in accordance with the present invention.

For ease of understanding, the following description will first provide a general overview of the flow diagram of FIG. 1A, followed by a more detailed explanation (in a table) of the different elements of the flow diagram.

In general terms, shown in the flow diagram of FIG. 1A is a direct expansion air conditioning system where return air Y from the conditioned space O is psychrometrically treated separately (and thus in parallel) from the outdoor air X (for ventilation) to achieve independent control of latent and sensible cooling. Following this separate treatment of the return air Y and the outdoor air X, the two air streams are then mixed to provide a single conditioned space supply air stream Z to be delivered to the conditioned space O.

The cooling process for the return air stream Y is principally sensible cooling, which is conducted in the return air sensible cooling treatment stage represented in this embodiment by a sensible evaporator H placed in the return air stream Y. The cooling process for the outdoor air stream X is principally latent cooling, which is conducted in the outdoor air latent cooling treatment stage represented in this embodiment by a dehumidification evaporator G placed in the outdoor air stream X.

As will be outlined in the following tabular description of the various components in the preferred embodiment, the thermal capacity of the dehumidification evaporator G is regulated in response to a desired conditioned space humidity set point, together with a load driven variance from that set point. Also, the thermal capacity of the sensible evaporator H is regulated in response to a desired conditioned space dry bulb temperature set point, together with a load driven variance from that set point.

Figure 1B:
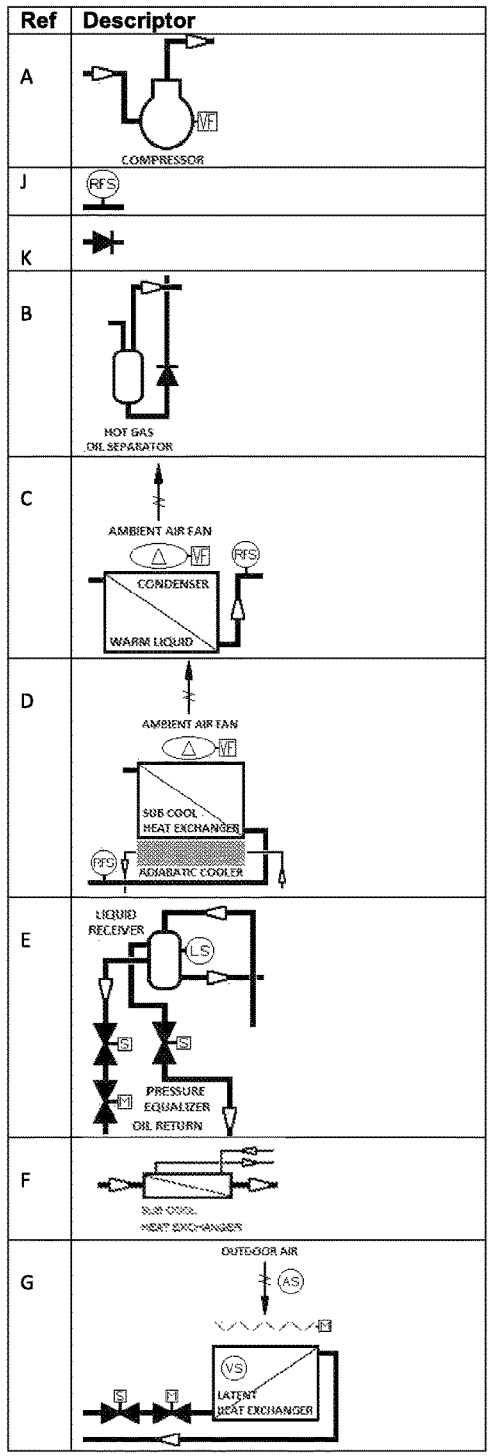
FIG. 1B is a chart highlighting the various elements illustrated in FIG. 1A.
Figure 1B:
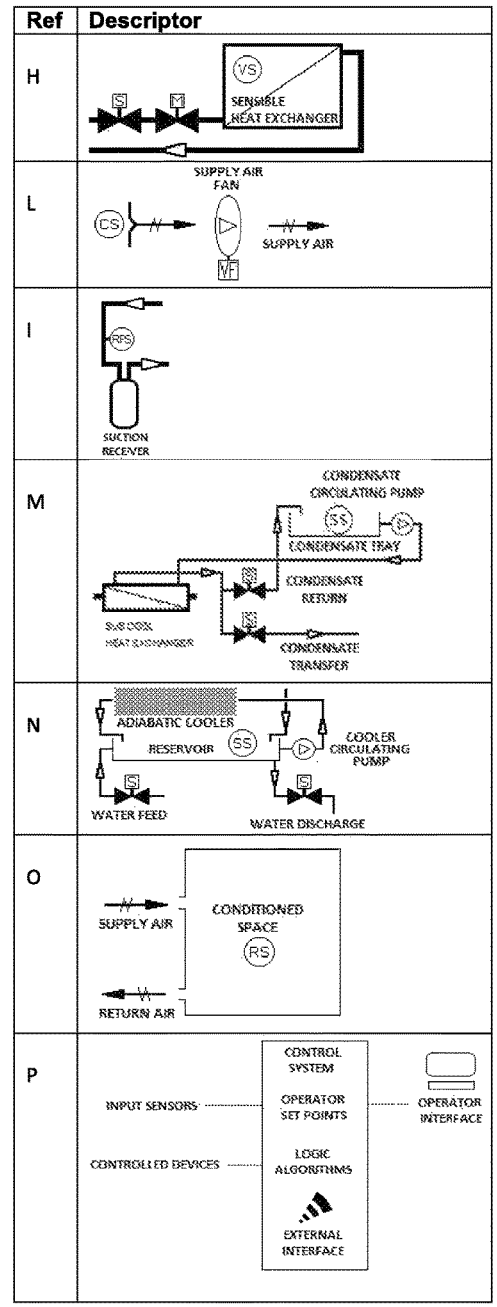

The following table (Table 1) provides a more detailed explanation of the various elements illustrated in the flow diagram of FIG. 1A and corresponds with the table in FIG. 1B, noting that the following schematic designations have been used for various of the control and sensor functions in the flow diagram:

M—Motor operated valves
VF—Variable fan control
S—Solenoid valves
AS—Ambient air sensors
CS—Combined air sensors (also referred to as supply air sensors)
RS—Room air sensors
VS—Velocity sensors (also referred to as air velocity sensors)
SS—Sump sensors (also referred to as reservoir sensors)
LS—Level sensors (also referred to as liquid refrigerant sensors)
RFS—Refrigeration sensors.

TABLE 1

Identification of Components in Figures 1A and 1B

| Ref | Function |
|---|---|
| A | The component compresses the gaseous refrigerant and provides refrigerant mass flow through the system. The variable performance drive increases or decreases the compressor refrigerant mass flow. |
| J | The component measures refrigerant pressure and temperature. |
| K | The component permits fluid or gas flow in only one direction. |
| B | The component is a mechanical device that separates oil from the refrigerant flow to return it to the compressor and to reduce oil flow through the evaporators. |
| C | The component acts as a heat exchanger to reject a portion of the sum of the heat of compression and the refrigeration effect into the local ambient air. It incorporates a fan to move air through the heat exchanger, a refrigerant temperature sensor and a variable performance drive to regulate the air mass flow rate of the fan. |
| D | The component acts as a sub-cool heat exchanger to reject heat into the local ambient air to sub-cool liquid refrigerant. It can incorporate an adiabatic pre-cooling media or a progressive indirect adiabatic cooling process, a fan to move air through the heat exchangers, a refrigerant temperature sensor and a variable performance drive to regulate the mass flow rate of the fan. |
| E | The component acts as a liquid refrigerant receiver for the storage and regulation of liquid flow through the system. It incorporates liquid level sensing, automated pressure equalization valve and automated oil return valves. |
| F | The component acts as a sub-cool heat exchanger to sub-cool liquid refrigerant utilizing condensate collected from the evaporators' latent cooling effect. |
| G | This is the air mixer. The component acts as a dehumidification evaporator to provide latent cooling to the outdoor air used to |

TABLE 1-continued

Identification of Components in Figures 1A and 1B

| Ref | Function |
|---|---|
|  | ventilate the conditioned space. Air is induced by the system supply air fan. Airflow is regulated by an automated damper. Liquid refrigerant flow is regulated through the evaporator by automated stop and metering valves. The ambient air sensor incorporates carbon dioxide, dry bulb and humidity sensing. The ambient airflow volume is measured by a differential pressure sensor. |
| H | The component acts as a sensible evaporator to provide sensible cooling to the conditioned space return air. Air is induced by the system supply air fan. Liquid refrigerant flow is regulated through the evaporator by automated stop and metering valves. The return airflow volume is measured by differential pressure sensor. |
| L | The component provides air movement through the system and the conditioned space. Sensors monitor the dry bulb and humidity of the return air and outdoor air exiting the evaporators. A mixed air space collects conditioned air from the dehumidification evaporator G and the sensible evaporator H. The supply airflow Z is regulated by variable performance control of the supply air fan. |
| I | The component receives gaseous refrigerant and oil and regulates the flow of gas and liquid for return to the compressor. Suction pressure and temperature is measured. |
| M | The component receives condensate via a condensate tray from the latent cooling process and transfers energy from the sub-cool heat exchanger F to the condensate. The condensate return is automated to maintain condensate volume within the tray and condensate transfer is automated to divert flow to the sub-cool heat exchanger D. |
| N | The component adiabatically cools ambient air to provide sub-cooling to the liquid refrigerant. Condensate is received from the latent cooling process or from an automated water feed. Water is recirculated over the cooling media by a circulating pump. A sensor in the water reservoir detects water level. |
| O | The conditioned space accepts supply air Z and permits air to circulate through to relieve sensible and latent heat from the space to recirculate to the sensible evaporator H. Space conditions are measured by dry bulb, humidity and carbon dioxide sensors. |
| P | The component controls the system through the input sensors, operator set points, logic algorithms and controlled devices. The system is managed through an operator interface and monitored through an external interface. |

It will be appreciated that Table 1 above describes the different air conditioning componentry that makes up the physical form of the preferred embodiment. The following table (Table 2) describes the logic algorithms that form the basis of the control of the preferred embodiment.

TABLE 2

Logic Algorithms for Control of Components in FIG. 1A

| Strategy | Functionality |
|---|---|
| Sensible cooling control strategy increasing deviation above set point | If the space dry bulb temperature is 0.1 degrees or greater than set point, initiate the outdoor air economy cycle strategy and incrementally increase the outdoor airflow economy cycle set point. If the space dry bulb temperature is 0.1 degrees or greater than set point, energize the return air evaporator liquid refrigerant stop valve to open. If the space dry bulb temperature 0.5 degrees greater than set point, commence incremental opening of the return air evaporator liquid refrigerant metering valve. If the return air evaporator liquid refrigerant metering valve opens to a position greater than 50%, commence incrementally increasing the supply air flow set point. If the supply air flow set point increases to greater than 70% output, energize the outdoor air evaporator liquid refrigerant stop valve to open and commence incremental drive of the outdoor air evaporator liquid refrigerant metering valve. If the outdoor air evaporator liquid refrigerant metering valve position actuator valve opens to a position greater than 50%, commence incrementally decreasing the compressor suction pressure set point. |
| Sensible cooling control strategy increasing deviation below set point | If the space dry bulb temperature is 0.1 degrees or greater below set point, commence incrementally increasing the compressor suction set point. If the space dry bulb temperature is 0.5 degrees or greater less than set point, commence incremental drive of the outdoor air evaporator liquid refrigerant metering valve position actuator valve to close. If the space dry bulb temperature is 0.5 degrees or greater less than set point, and the outdoor air evaporator liquid refrigerant metering valve has been driven closed, de-energize the outdoor air evaporator liquid refrigerant stop valve to close and commence incremental drive of the return air evaporator liquid refrigerant metering valve to close. If the return air evaporator liquid refrigerant metering valve drives to a position less than 70%, commence incrementally decreasing the supply air flow set point. If the return air evaporator liquid refrigerant metering valve has been driven closed to 0%, de-energize the return air evaporator liquid refrigerant stop valve to close. If the supply airflow set point has reduced to less than 50%, incrementally decrease the outdoor airflow economy cycle set point. |

TABLE 2-continued

Logic Algorithms for Control of Components in FIG. 1A

| Strategy | Functionality |
|---|---|
| Latent cooling control strategy increasing deviation above set point | If the space dew point temperature is 0.1 degrees or greater than set point, energize the outdoor air evaporator liquid refrigerant stop valve to open.<br>If the space dew point temperature is 0.5 degrees greater than set point, commence incremental drive opening of the outdoor air evaporator liquid refrigerant metering valve.<br>If the outdoor air evaporator liquid refrigerant valve opens to a position greater than 50%, commence incrementally increasing the outdoor air flow set point.<br>If the outdoor air flow set point increases to greater than 70%, commence incrementally decreasing the compressor suction set point. |
| Latent cooling control strategy decreasing deviation below set point | If the space dew point temperature is 0.1 degrees or greater below set point, commence incrementally increasing the compressor suction set point.<br>If the space dew point temperature is 0.5 degrees or greater less than set point, commence incremental drive of the outdoor air evaporator liquid refrigerant metering valve to close.<br>If the space temperature is 0.5 degrees or greater less than set point, and the outdoor air evaporator liquid refrigerant metering valve position actuator valve has been driven to less than 50%, commence reducing the outdoor air flow set point.<br>If the space temperature is 0.5 degrees or greater less than set point, and the outdoor air flow set point has reduced to minimum, and the outdoor air evaporator liquid refrigerant metering valve has been driven closed to 0%, de-energize the outdoor air evaporator liquid refrigerant stop valve to close. |
| Supply air flow set point | The supply airflow set point will be maintained between a minimum set point and a maximum set point. The supply airflow set point will be adjusted by the sensible cooling control strategy.<br>The supply airflow will be calculated by the addition of the outdoor airflow and the return airflow. |
| Supply air flow greater than set point | If the supply airflow is greater than the supply airflow set point, incrementally decrease the supply air fan speed. |
| Supply air flow less than set point | If the supply airflow is less than supply airflow set point, incrementally increase the supply air fan speed. |
| Outdoor airflow set point | The outdoor airflow set point will be maintained between a minimum ventilation set point, a maximum ventilation set point and a maximum outdoor airflow set point for economy cycle operation. The outdoor airflow set point will be adjusted the greater of any of the latent cooling strategy, the outdoor air economy strategy or the $CO_2$ concentration strategy. |
| Outdoor air flow greater than set point | If the outdoor airflow is greater than the outdoor airflow set point, incrementally close the outdoor air throttling damper. |
| Outdoor air flow less than set point | If the outdoor airflow is below the outdoor airflow set point incrementally open the outdoor air throttling damper. |
| $CO_2$ concentration strategy | If the concentration of $CO_2$ within the return air rises above set point, increase the outdoor ventilation airflow set point.<br>If the concentration of $CO_2$ within the return air falls below set point, decrease the outdoor ventilation airflow set point. |
| Outdoor air economy strategy | If the ambient dewpoint is less than the space dew point, and the ambient dry bulb is less than the space dry bulb, enable operation of the outdoor air throttling damper economy cycle.<br>If the ambient dew point is greater than the space dew point, and the ambient dry bulb is greater than the space dry bulb, disable operation of the outdoor air throttling damper economy cycle. |
| Return airflow calculation | The return airflow calculation will be determined utilizing the return air evaporator coil differential sensor, the entering return air evaporator coil dew point sensor and the leaving return air evaporator coil dew point sensor.<br>The return air coil airflow will be determined in accordance with a wetted coil dew point calculation. |
| Outdoor airflow calculation | The outdoor airflow calculation will be determined utilizing the outdoor air evaporator coil differential sensor, the entering outdoor air evaporator coil dew point sensor and the leaving outdoor air evaporator coil dew point sensor.<br>The outdoor air coil airflow will be determined in accordance with a wetted coil dew point calculation. |
| Compressor start | The compressor variable performance drive will be energized in response to the low liquid refrigerant level |

TABLE 2-continued

Logic Algorithms for Control of Components in FIG. 1A

| Strategy | Functionality |
|---|---|
| | compressor start sensor, providing there is a minimum of opening of either the outdoor air evaporator liquid refrigerant thermal expansion flow metering valve or the return air evaporator liquid refrigerant thermal expansion flow metering valve.<br>If the low liquid refrigerant sensor detects an absence of liquid refrigerant, energize the liquid receiver gas relief stop valve to open for a time period and energize the compressor variable performance drive to operate at low speed. |
| Liquid receiver low level charging | The liquid receiver refrigerant low level will be regulated by the low liquid refrigerant level sensor.<br>If the low liquid refrigerant level sensor detects an absence of liquid refrigerant, increase the frequency of the compressor variable performance drive. |
| Liquid receiver high level charging | The liquid receiver refrigerant high level will be regulated by the high liquid refrigerant level sensor.<br>If the high liquid refrigerant level sensor detects the presence of liquid refrigerant, decrease the frequency of the compressor variable performance drive. |
| Compressor stop | The compressor variable performance drive will be de-energized in response to the high liquid refrigerant level compressor stop sensor.<br>If the high liquid refrigerant level compressor stop sensor detects the presence of liquid refrigerant, de-energize the compressor variable performance drive. |
| Compressor oil return | Oil will be returned to the compressor in response to the transition liquid refrigerant level sensor.<br>When the transition liquid refrigerant level sensor detects a change of state from an absence of liquid refrigerant to a presence of liquid refrigerant/oil, energize the oil return stop valve to open and drive the oil return metering valve open to a fixed position.<br>After a time duration, de-energize the oil return stop valve to close and drive closed the oil return metering valve. |
| Compressor suction pressure set point | If the liquid refrigerant mass flow rate is not adequate to satisfy sensible and latent cooling, the compressor variable frequency drive will be advanced by either the sensible or latent cooling strategies through detecting the refrigerant suction pressure. The set point at commencement of a signal from either the sensible or latent cooling strategies will be the pressure at commencement.<br>On receipt of a lowering or raising suction pressure signal from either the sensible or latent cooling strategies, lower or raise the refrigerant suction pressure set point. The lowering of set point adjustment will take precedence over the raising of set point signal. |
| Compressor suction pressure | The compressor variable performance drive will increase or decrease frequency in response to the compressor suction pressure set point. The frequency will be increased incrementally when the suction pressure is higher than the suction pressure set point. The frequency will be decreased incrementally when the suction pressure is lower than the suction pressure set point. |
| Condenser fan start | The condensing fans will be energized to maintain condensing liquid temperature near ambient conditions.<br>If the differential temperature between the sub-cooled high pressure liquid refrigerant temperature and the entering outdoor air dry bulb temperature is greater than the start differential temperature set point, energize the condenser fan variable frequency drive and commence operation at minimum frequency. |
| Condenser fan stop | The condensing fans will be de-energized to conserve energy when condensing temperature approaches ambient conditions.<br>If the differential temperature between sub-cooled high pressure liquid refrigerant temperature and the entering outdoor air dry bulb temperature is less than the stop differential temperature set point, de-energize the condenser fan variable performance drive. |
| Condensing temperature control | The condensing head pressure will be regulated by the high pressure liquid refrigerant temperature and ambient dry bulb temperature.<br>If the differential temperature between the sub-cooled high pressure liquid refrigerant temperature and the entering outdoor air dry bulb temperature is greater than the control differential set point (and rising), increase the condenser |

TABLE 2-continued

Logic Algorithms for Control of Components in FIG. 1A

| Strategy | Functionality |
|---|---|
| | fan variable performance drive frequency.<br>If the differential temperature between the sub-cooled high pressure liquid refrigerant temperature and the entering outdoor air dry bulb temperature is less than the control differential set point (and falling), decrease the condenser fan variable performance drive frequency. |
| Sub-cooler fan start | The sub-cooler fan will be energized to maintain liquid temperature near ambient wet bulb conditions.<br>If the differential temperature between the sub-cooled high pressure liquid refrigerant temperature and the outdoor air wet bulb temperature is greater than the start differential temperature set point, energize the sub cooler fan variable performance drive and commence operation at minimum frequency, and energize the sub-cooler water circulating pump.. |
| Sub-cooler fan stop | The sub-cooler fan will be de-energized to conserve energy when condensing temperature approaches ambient conditions.<br>If the differential temperature between sub-cooled high pressure liquid refrigerant temperature and the entering outdoor air wet bulb temperature is less than the stop differential temperature set point, de-energize the condenser fan variable performance drive and the sub-cooler water circulating pump. |
| Sub-cooler reservoir fill | The sub-cooler reservoir will be water filled at the commencement of compressor operation daily.<br>At the commencement of the first compressor operation of the day, de-energize closed the water discharge stop valve and energize open the water feed stop valve. When the reservoir high level water sensor detects water, de-energize to close the water feed valve and energize the adiabatic cooler circulating pump in conjunction with the sub-cooler fan operation. When the reservoir mid-level water sensor detects an absence of water, energize open the water feed stop valve.<br>De-energize the cooler pump when an absence of water is detected at the reservoir low level sensor.<br>At the cessation operation of the supply air fan, the water discharge valve will be energized open and the feed water valve will be de-energized closed. |
| Sub-cooler temperature control | The sub-cooler temperature will be regulated by the high pressure liquid refrigerant temperature and ambient wet bulb temperature.<br>If the differential temperature between the sub-cooled high pressure liquid refrigerant temperature and the entering outdoor air wet bulb temperature is greater than the control differential set point (and rising), increase the sub-cooler fan variable performance drive frequency.<br>If the differential temperature between the sub-cooled high pressure liquid refrigerant temperature and the entering outdoor air evaporator wet bulb temperature is less than the control differential set point (and falling), decrease the sub-cooler fan variable performance drive frequency. |
| Head pressure safety | If the head pressure safety switch rises above the safe to operate set point, trip the manual reset switch to open the start circuit to the compressor contactor.<br>The head pressure safety switch monitoring relay will change state from normally open to closed to identify a head pressure safety switch intervention. |
| Head pressure safety incident | If head pressure sensor rises above the head pressure warning set point, reduce the compressor variable frequency drive incrementally and increase condenser fan variable frequency drive incrementally to reduce the head pressure to a safe operating pressure differential below the head pressure warning set point and raise a head pressure safety incident notice.<br>If head pressure sensor falls below the safe to operate pressure differential following a head pressure safety incident, resume compressor, liquid refrigerant and condenser head pressure control strategies and raise resumption of automatic head pressure control notice. |
| Low pressure safety | If suction pressure safety switch falls below a saturated suction temperature (SST) pressure of 0° C., trip the manual reset switch to open the start circuit to the compressor contactor.<br>The low pressure safety switch monitoring relay will |

TABLE 2-continued

Logic Algorithms for Control of Components in FIG. 1A

| Strategy | Functionality |
|---|---|
| | change state from normally open to closed to identify a low pressure safety switch intervention. |
| Low pressure safety incident | If suction pressure sensor falls below a SST pressure of 4° C., reduce the compressor variable frequency drive incrementally and raise a suction pressure safety incident notice. If the suction pressure sensor rises to above a SST pressure of 8° C. following a suction pressure safety incident, resume compressor control and raise resumption of automatic suction pressure control notice. |
| Low suction temperature safety incident | If the suction temperature sensor falls below 6° C., reduce compressor variable performance drive frequency incrementally and raise a suction temperature safety incident notice. If the suction temperature sensor rises to above 10° C., following a suction temperature safety incident resume compressor control and raise resumption of automatic suction temperature control notice. |
| Super-cooler operation | Operation of liquid refrigerant super-cool heat exchanger will be managed utilizing the condensate tray water level sensor, the condensate circulating pump, the condensate return automated shut off valve and the condensate transfer automated shut off valve. Operation of the valves and pump will be sequential as follows: When the mid level condensate tray water level sensor indicates the presence of condensate, the condensate return stop valve will be energized to open and the condensate circulating pump will be energized. When the high level condensate tray water level sensor indicates the presence of condensate, the condensate transfer stop valve will be de-energized to open and the condensate return stop valve will be de-energized closed. When the high level condensate level sensor indicates the absence of condensate, the condensate return stop valve will be energized to open and the condensate transfer stop valve will be de-energized to close. When the low level condensate level sensor indicates an absence of condensate, the condensate pump will be de-energized. At the cessation operation of the supply air fan, the condensate transfer valve will be de-energized open, the condensate return valve will be de-energized closed and the condensate pump be energized for a time period to evacuate condensate from the tray. |
| Refrigeration sensors | Compressor head pressure safety switch<br>Compressor discharge temperature<br>Compressor discharge pressure<br>Condenser exiting liquid temperature<br>Sub-cooler exiting liquid temperature<br>Liquid receiver temperature<br>Liquid receiver pressure<br>Super-cooler exiting liquid temperature<br>Compressor suction pressure safety switch<br>Compressor suction temperature<br>Compressor suction pressure |
| Ambient air sensors | Entering evaporator dry bulb<br>Entering evaporator dew point<br>Carbon dioxide<br>Evaporator pressure differential<br>Exiting evaporator dry bulb<br>Exiting evaporator dew point |
| Return air sensors | Dry bulb remote space located<br>Dew point remote space located<br>Carbon dioxide remote space located<br>Entering evaporator dry bulb<br>Entering evaporator dew point<br>Evaporator pressure differential<br>Exiting evaporator dry bulb<br>Exiting evaporator dew point |
| Supply air sensors | Dry bulb<br>Dew point |
| Water sensor | Condensate tray high level<br>Condensate tray mid level<br>Condensate tray low level |

TABLE 2-continued

Logic Algorithms for Control of Components in FIG. 1A

| Strategy | Functionality |
|---|---|
| | Sub-cooler reservoir high level |
| | Sub-cooler reservoir mid level |
| | Sub-cooler reservoir low level |
| Comfort reporting | The comfort of occupants will be evaluated consistent with ASHRAE PMV calculator. The conditioned space dry bulb, dew point and a quotient of the supply air quantity will be used as input. A trend of the notional PMV will be logged. |
| Energy Efficiency calculating | Compressor COP |
| | The compressor COP will be calculated at intervals utilizing the following input devices: |
| | Compressor kW - extract energy consumption from compressor variable frequency drive high level interface |
| | Ambient dry bulb |
| | Ambient dew point |
| | Leaving outdoor air evaporator dewpoint |
| | Leaving outdoor air evaporator dry bulb temperature |
| | Return air dry bulb |
| | Return air dew point |
| | Leaving return air evaporator dewpoint |
| | Leaving return air evaporator dry bulb temperature |
| | Outdoor airflow |
| | Return airflow |
| | The compressor refrigeration effect will be calculated. |
| | Compressor COP will calculated. |
| | The compressor COP will be trend logged. |
| | System COP |
| | The system COP will be calculated at intervals utilizing the following high level interfaces from the compressor refrigeration effect calculation and the following variable performance drive high level interfaces: |
| | Compressor |
| | Supply air fan |
| | Condenser air fans |
| | Sub cooler fans |
| | The system COP will be trend logged. |
| Trend and event logging | All input sensors and output events will be trend log capable. |
| Alarm events | All input sensors and variable frequency drives will be alarm event capable. |
| Operator interface | All controlled devices, input sensors, operator set points, trend logs and alarm identification and cancelling will be accessible to for via a tiered access review through a graphical operator interface. |
| External interface | The operator interface will be accessible through an internet web based external connection. |
| | Alarming events will generate internet email messaging to identified plant operators. |

As will be appreciated from Table 1 and Table 2, the use of evaporators to separately manage space dry bulb and space humidity enhances occupant comfort, while the use of control algorithms to regulate liquid refrigerant to the evaporators in response to space load conditions enhances the utilization of evaporator heat transfer capabilities to extend the refrigeration effect of the circulating refrigerant mass flow. Also, the preferred use of sub-coolers and sub-coolers in the heat of rejection condensing process extends the refrigeration effect of the circulating refrigerant mass flow and reduces compressor head pressure, and the preferred use of liquid refrigerant sensing decouples the volumetric dependence of compressor head pressure from compressor suction pressure.

In conjunction with the preferred use of liquid refrigerant metering valves and suction gas set point management, the adoption of these components configured in the manner described enables evaporators to operate at higher saturation temperature, thereby reducing compressor pressure lift requirements for generation of an enhanced refrigeration effect.

Additionally, the preferred use of volumetric calculation of outdoor air flow and supply airflow in response to feedback signals to provide ventilation amenity and space comfort, reduces both heat load and air circulation energy consumption.

A person skilled in the art will understand that there may be variations and modifications other than those specifically described. It is to be understood that the invention includes all such variations and modifications. The invention also includes all components, steps, functions and features referred to, or indicated in this specification, individually or collectively, and any and all combinations of any two or more of those components, steps, functions and features.

The invention claimed is:

1. An air conditioning system, the air conditioning system being capable of treating a conditioned space by treating outdoor air from outside the conditioned space and treating air returned from inside the conditioned space, and mixing the outdoor air with the returned air to form supply air for the conditioned space, the air conditioning system including:

an outdoor air latent cooling treatment stage and a return air sensible cooling treatment stage, and an air mixer for mixing outdoor air with return air to form the conditioned space supply air;

wherein the outdoor air latent cooling treatment stage includes a dehumidification evaporator and the return air sensible cooling treatment stage includes a sensible evaporator, both evaporators being within a direct expansion refrigeration circuit, and wherein the dehumidification evaporator thermal capacity is regulated in response to conditioned space humidity and the sensible evaporator thermal capacity is regulated in response to conditioned space dry bulb temperature.

2. The air conditioning system according to claim 1, including a liquid refrigerant receiver that stores transitional refrigerant.

3. The air conditioning system according to claim 2, wherein the liquid refrigerant receiver provides storage and separation of liquid refrigerant and compressor oil for independent management through the system.

4. The air conditioning system according to claim 2, wherein the liquid refrigerant receiver incorporates liquid level sensing, an automated pressure equalization valve and automated oil return valves.

5. The air conditioning system according to claim 1, including a two stage refrigerant oil separation system.

6. The air conditioning system according to claim 5, including a first stage hot gas separator and a second stage cool liquid (oil) separator.

7. The air conditioning system according to claim 6, wherein the second stage cool liquid separator is provided by a liquid refrigerant receiver that stores transitional refrigerant.

8. The air conditioning system according to claim 1, including a sub-cool heat exchanger to reject heat into outdoor air to sub-cool liquid refrigerant.

9. The air conditioning system according to claim 8, wherein the sub-cool heat exchanger incorporates an adiabatic pre-cooling media or a progressive indirect adiabatic cooling process.

10. The air conditioning system according to claim 9, wherein the sub-cool heat exchanger also includes a fan, a refrigerant temperature sensor and a variable performance drive to regulate the mass flow rate of the fan.

11. The air conditioning system according to claim 1, including a sub-cool heat exchanger to sub-cool liquid refrigerant utilizing condensate collected from the dehumidification evaporator.

12. The air conditioning system according to claim 1, including a three stage heat of rejection process that incorporates an ambient condenser, a sub-cool heat exchanger and an additional sub-cool heat exchanger.

13. The air conditioning system according to claim 3, wherein the liquid refrigerant receiver incorporates liquid level sensing, an automated pressure equalization valve and automated oil return valves.

14. The air conditioning system according to claim 13, including a three stage heat of rejection process that incorporates an ambient condenser, a sub-cool heat exchanger and an additional sub-cool heat exchanger.

15. The air conditioning system according to claim 2, including a three stage heat of rejection process that incorporates an ambient condenser, a sub-cool heat exchanger and an additional sub-cool heat exchanger.

16. The air conditioning system according to claim 4, including a three stage heat of rejection process that incorporates an ambient condenser, a sub-cool heat exchanger and an additional sub-cool heat exchanger.

* * * * *